US012766821B2

(12) United States Patent
McCalley et al.

(10) Patent No.: US 12,766,821 B2
(45) Date of Patent: Oct. 20, 2026

(54) COMPOUND CURVE COMPONENT LAMINATION METHOD AND PRODUCT

(71) Applicant: Rockwell Collins, Inc., Cedar Rapids, IA (US)

(72) Inventors: Cameron T McCalley, Marion, IA (US); James D Sampica, Anamosa, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 494 days.

(21) Appl. No.: 18/200,824

(22) Filed: May 23, 2023

(65) Prior Publication Data

US 2024/0391228 A1 Nov. 28, 2024

(51) Int. Cl.

*B32B 41/00* (2006.01)
*B32B 1/00* (2006.01)
*B32B 7/12* (2006.01)
*B32B 37/10* (2006.01)
(Continued)

(52) U.S. Cl.

CPC ................ *B32B 37/12* (2013.01); *B32B 1/00* (2013.01); *B32B 7/12* (2013.01); *B32B 37/1009* (2013.01); *B32B 38/0004* (2013.01); *B32B 2250/03* (2013.01); *B32B 2250/40* (2013.01); *B32B 2307/412* (2013.01); *B32B 2309/68* (2013.01)

(58) Field of Classification Search

CPC ............. B32B 37/12; B32B 1/00; B32B 7/12; B32B 37/1009; B32B 38/0004; B32B 2250/03; B32B 2250/40; B32B 2307/412; B32B 2309/68; B32B 2457/20; B32B 17/10005; B32B 2605/08; B32B 2605/18; B32B 17/10816; B32B 17/10844; B32B 17/10935; B32B 37/1284; B32B 2605/006; B32B 38/1866

USPC .................... 156/60, 64, 350, 351, 378, 379

See application file for complete search history.

(56) References Cited

U.S. PATENT DOCUMENTS

| | | | |
|---|---|---|---|
| 5,324,373 | A | 6/1994 | Gillner et al. |
| 11,084,271 | B1 | 8/2021 | Gollier |
| 11,173,696 | B2 | 11/2021 | Gibbons |

(Continued)

FOREIGN PATENT DOCUMENTS

| | | | |
|---|---|---|---|
| EP | 3588183 | A1 | 1/2020 |
| WO | 2021105879 | A1 | 6/2021 |

OTHER PUBLICATIONS

European Patent Office, Extended European Search Report received in EP Application No. 24177780.4, Oct. 16, 2024, 9 pages.

*Primary Examiner* — Michael N Orlando
*Assistant Examiner* — Joshel Rivera
(74) *Attorney, Agent, or Firm* — Suiter Swantz IP

(57) ABSTRACT

A direct dry film (DDF) lamination method includes providing a chamber including a bladder, positioning a frame in the chamber, positioning a compound curve substrate in an interior space within the frame, and suspending, by the frame, an optically clear adhesive (OCA) sheet over the compound curve substrate. In embodiments, a top liner of the OCA sheet is scored or cut to introduce weakness imparting flexibility in the sheet corresponding to the curvature of the compound curve substrate. The method continues with evacuating the chamber, deploying the bladder, retracting the bladder, and venting the chamber. Additional steps prepare the product for further boding with a flexible film or rigid part having a matched curvature profile.

20 Claims, 6 Drawing Sheets

(51) Int. Cl.
*B32B 37/12* (2006.01)
*B32B 38/00* (2006.01)

(56) References Cited

U.S. PATENT DOCUMENTS

| | | | | |
|---|---|---|---|---|
| 2003/0056887 | A1 | 3/2003 | Sicola | |
| 2008/0314499 | A1 * | 12/2008 | Begon | B29C 63/0073 156/367 |
| 2009/0277578 | A1 | 11/2009 | Sung et al. | |
| 2010/0282416 | A1 | 11/2010 | Sung et al. | |
| 2020/0157395 | A1 * | 5/2020 | Liu | B32B 27/281 |
| 2022/0288911 | A1 | 9/2022 | Mo et al. | |

* cited by examiner

COMPOUND CURVE COMPONENT LAMINATION METHOD AND PRODUCT

TECHNICAL FIELD AND BACKGROUND

The present disclosure relates generally to optical bonding technology, and more particularly, to methods of direct dry film (DDF) laminating compound curve substrates and compound curve products produced by such methods.

Optical bonding is the process of bonding two or more optical components together using a clear optical index matched adhesive. Examples of components to be optically bonded include, but are not limited to, anti-reflective glass, protective glass, touch screens, ITO heaters, EMI shields, and additional displays. Components may be bonded to the front, rear, or both sides of a display or to another optical component. Optical bonding may also be used to produce aircraft canopies, automotive windshields, and other safety glass applications. Industries benefiting from optical bonding include, but are not limited to, military, avionics, ground vehicles, and automotive displays requiring very high optical and environmental performances.

Optical bonding technologies include dry optical bonding and liquid optical bonding. In some cases, dry optical bonding is preferred considering scalability, low environmental impact, dimensional superiority, and better performance. While dry optical bonding is ideal for planar and single axis curved substrates via cold forming and optically clear adhesive (OCA) application, current processes for applying dry adhesives to compound curve substrates is not possible.

Therefore, what is needed is a solution for dry bonding compound curve substrates.

BRIEF SUMMARY

In one aspect, embodiments of the inventive concepts disclosed herein are directed to a method of direct dry film (DDF) laminating a compound curve substrate. In embodiments, the method includes providing a chamber including a bladder, positioning a frame in the chamber, and positioning a compound curve substrate in an interior space formed within the frame. The method continues by suspending, via the frame, an optically clear adhesive (OCA) sheet over the compound curve substrate, the OCA sheet including a top liner. The method continues with structurally altering the top liner at one or more locations corresponding to curvature of the compound curve substrate, evacuating the chamber to induce a vacuum, deploying the bladder to bring the OCA sheet into conformed contact with the compound curve substrate, retracting the bladder, and venting the chamber. In embodiments, the method continues with bonding a matched second substrate to the applied, bonded and conformed OCA sheet.

In some embodiments, the OCA sheet further includes a bottom liner, and the method further includes removing the bottom liner before evacuating the chamber.

In some embodiments, structurally altering the top liner includes scoring the top liner.

In some embodiments, structurally altering the top liner includes cutting the top liner.

In some embodiments, the method further includes positioning the matched second substrate in the chamber, evacuating the chamber to induce a vacuum, deploying the bladder to bring the matched compound curve second substrate into conformed contact with the OCA sheet, retracting the bladder, and venting the chamber.

In some embodiments, the second substrate is a flexible film or a rigid compound curve substrate having a curvature profile matching a curvature profile of the first compound curve substrate.

In some embodiments, the method further includes, prior to bonding the second matched substrate to the OCA sheet, trimming the OCA sheet to the substrate edge or insert dimension, and removing the top liner.

In some embodiments, the OCA sheet is maintained in conformed contact with the compound curve substrate for a predetermined time period.

In some embodiments, the method further includes heating at least one of the chamber, the OCA sheet, and the compound curve substrate.

In some embodiments, the OCA sheet is coupled to the frame by a plurality of elastic members.

According to another aspect, the present disclosure provides a laminated compound curve product including a compound curve substrate and a second substrate bonded together by an intermediate optically clear adhesive (OCA) sheet, wherein the laminated compound curve product is produced according to a method of direct dry film (DDF) lamination. In embodiments, the method includes providing a chamber including a bladder, positioning a frame in the chamber, and positioning the compound curve substrate in an interior space within the frame. The method continues with suspending, by the frame, the OCA sheet over the compound curve substrate, the OCA sheet including a top liner. The method continues by structurally altering the top liner at one or more locations corresponding to curvature of the compound curve substrate, evacuating the chamber to induce a vacuum, deploying the bladder to bring the OCA sheet into conformed contact with the compound curve substrate, retracting the bladder, and venting the chamber. In embodiments, the method continues by bonding the second substrate to the applied, bonded, and conformed OCA sheet.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
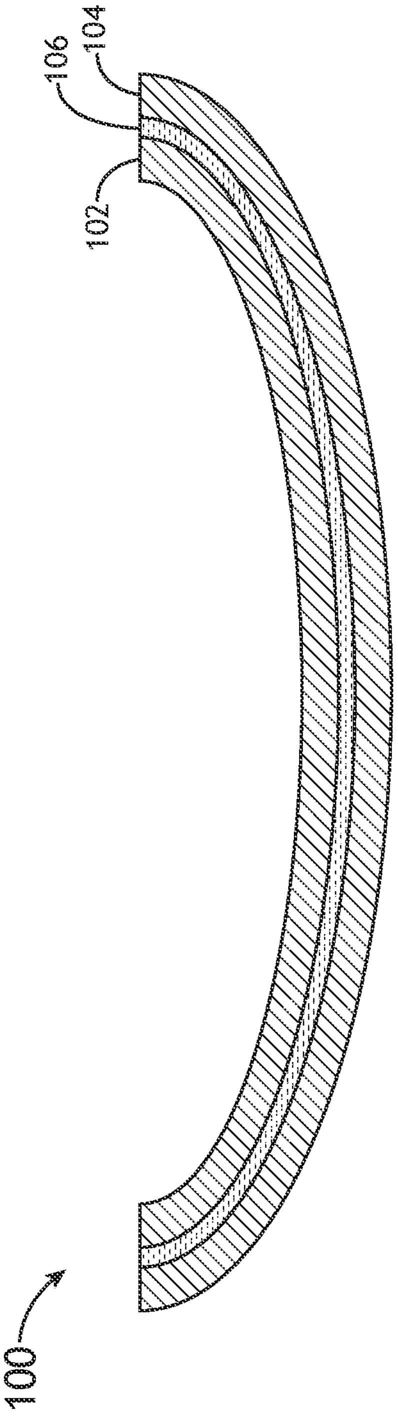
FIG. 1 is a schematic cross-section of a compound curve product produced according to a dry bonding lamination method, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to methods of dry bonding compound curve substrates and compound curve laminations produced according to such methods. In some embodiments, the lamination may be a direct dry film (DDF) lamination for applying a flexible adhesive layer to a rigid, compound curve substrate in a bonded stack, i.e., flexible-to-rigid lamination. In some embodiments, the lamination may be a DDF lamination for applying a rigid compound curve part to a compound curve substrate in a bonded stack, i.e., rigid-to-rigid lamination, wherein the rigid compound curve part and the rigid compound curve substrate having a matching curvature profile.

In embodiments, the optically clear adhesive (OCA) may be implemented in sheet form, i.e., "OCA sheet" as referred to herein, applied using an additional tooling piece in which the OCA sheet is suspended above/over the compound curve (i.e., non-planar and not single axis curved) substrate in the DDF chamber, with the bottom liner peeled and no contact made until a vacuum is achieved in the chamber. In some embodiments, the suspension may be achieved with a "picture frame" tool configured to span the shaped substrate and the support tooling. In embodiments, the top liner (i.e., liner provided on a top side of the OCA sheet facing away from the compound curve substrate) is scored, cut or otherwise altered to introduce flexibility into the sheet at strategic locations to allow the sheet to give way while the bottom liner above the part is removed to bring the adhesive into contact with the curved substrate. During the DDF process, a bladder serves to bring the OCA sheet into intimate contact across the full shape of the curved substrate. When the DDF process is complete, the prepared substrate is ready to have the OCA sheet trimmed, as necessary, such that the next shaped substrate may be bonded, for instance a flexible film or matched curvature substrate.

FIG. 1 is a schematic illustration of a bonded product produced according to a dry bonding lamination method according to the present disclosure. The product 100, for example an aircraft canopy, automotive windshield, automotive window, or other safety glass, generally includes a compound curve substrate 102 and a matched (e.g., shaped or optically) second substrate 104 bonded together by an intermediate optically clear adhesive (OCA) sheet 106. In some embodiments, each of the first substrate 102 and the second substrate 106 are compound curve substrates, having a matching curvature profile, provided in a bonded stack, i.e., rigid-to-rigid lamination or flexible-to-rigid lamination. In some embodiments, the product 100 includes additional substrates each bonded by a further intermediate OCA sheet or other adhesive interlayer. As used herein, the term "compound curve" means not planar and not single axis curved. For example, a compound curve may be normal or reverse curved.

Figure 2:
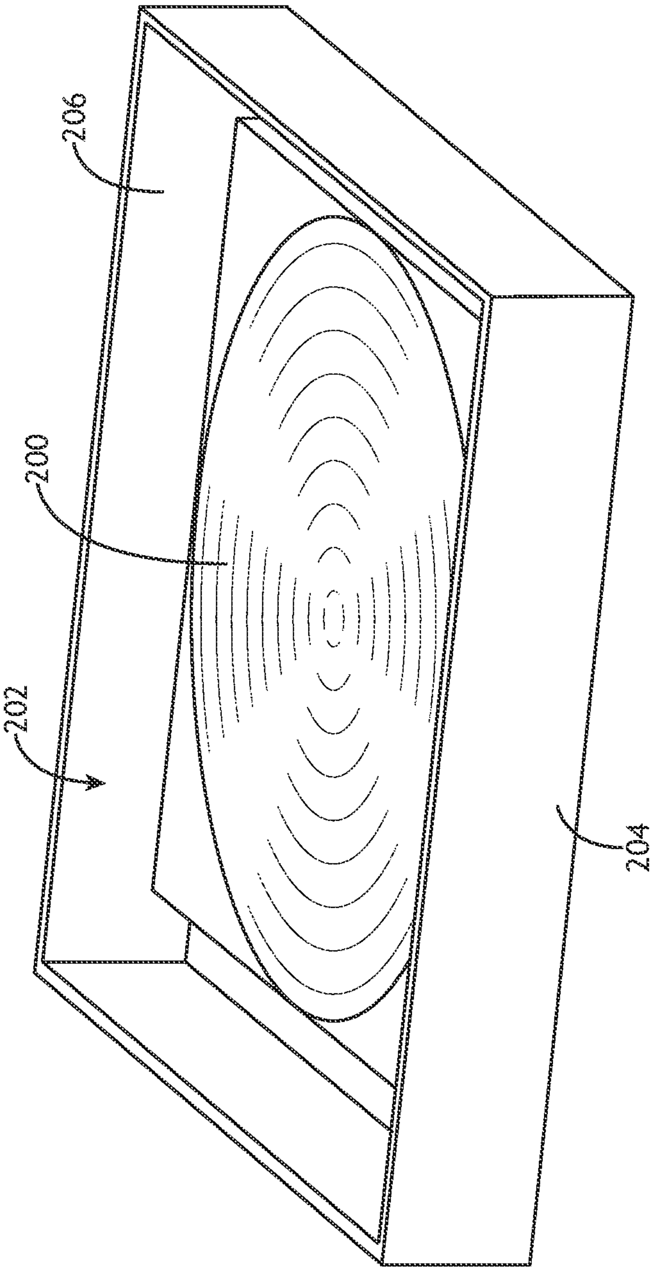
FIG. 2 is a schematic illustration of tooling for implementing a direct dry film (DDF) lamination method, in accordance with example embodiments of this disclosure.

FIG. 2 is a schematic illustration of tooling suitable for implementing direct dry film (DDF) lamination methods according to the present disclosure. A non-planar substrate 200 is positioned in an interior space 202 formed within a frame 204 to be positioned in a DDF chamber. The frame 204 is configured to hold an OCA sheet 206 suspended above the non-planar substrate 200. The OCA sheet 206 includes a top removable liner structurally altered to induce flexibility in the sheet, and a bottom removable liner to be removed prior to bonding with the substrate 200. As discussed further below, the OCA sheet 206 is held suspended above the non-planar substrate 200 in order to be positioned to move down by contact from the deploying bladder, after evacuation, during the DDF cycle.

Figure 3:
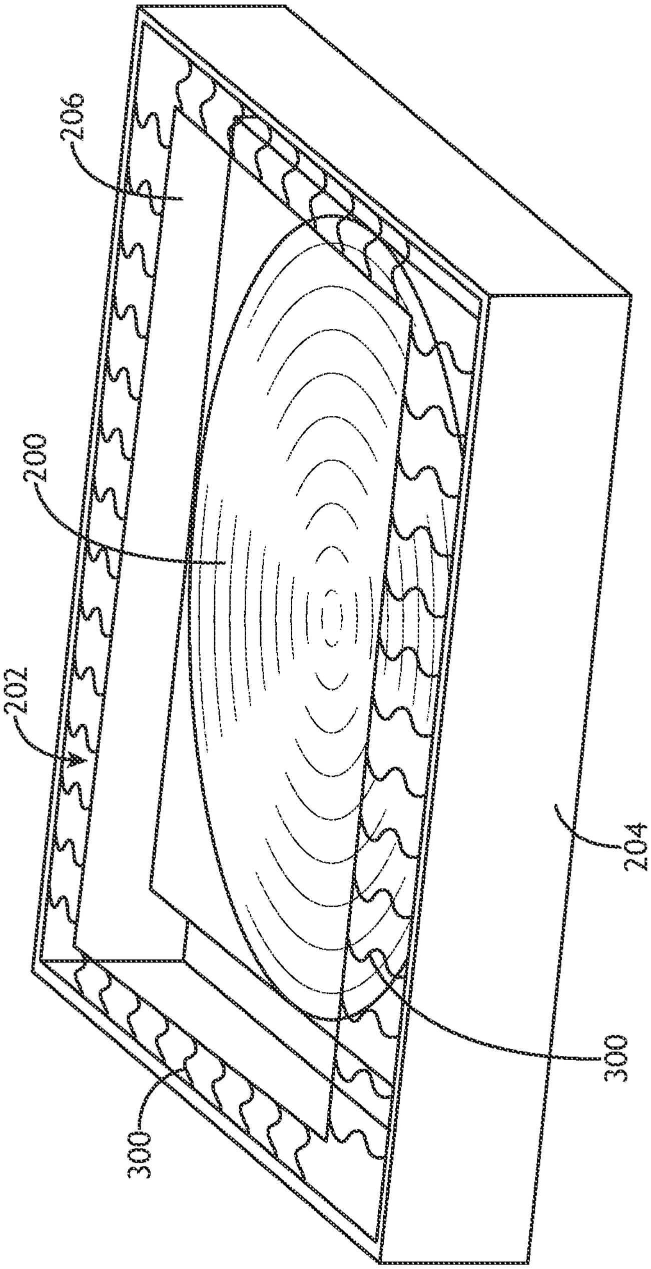
FIG. 3 is a schematic illustration of alternate tooling for implementing a DDF lamination method, in accordance with example embodiments of this disclosure.

FIG. 3 is a schematic illustration of alternate tooling for implementing the direct dry film (DDF) lamination method according to the present disclosure. As in FIG. 2, a non-planar substrate 200 is positioned in the interior space 202 formed within a frame 204 to be positioned in the DDF chamber. The frame 204 is configured to hold an OCA sheet 206 suspended above the non-planar substrate 200. In this embodiment, the OCA sheet 206 may be attached at its peripheral edges to the frame 204 by a plurality of resiliently flexible members 300, for instance rubber bands, springs, or the like, configured to permit the OCA sheet 206 to move relative to the frame 204 to move down by contact with the deploying bladder, after evacuation, during the DDF cycle.

FIGS. 4A-D illustrate schematically suitable tooling and sequential steps for DDF laminating a compound curve substrate according to the present disclosure. The tooling includes a DDF chamber 400 forming an interior space 402 configured to be atmospherically controlled and evacuated. A flexible bladder 404 is provided within the interior space 402 and is configured to be selectively deployed and retracted. In use, the flexible bladder 404 deploys, such as with a controlled pressure differential, to move into contact with the OCA sheet 206 to thereby move the OCA sheet 206 into conformed contact with the underlying compound curve substrate 200. The compound curve substrate 200 is positioned within the bounds of the frame 204 and below the OCA sheet 206 suspended from above. In embodiments, the OCA sheet 206 may be dimensioned larger than the compound curve substrate 200 to ensure complete coverage of the bonding surface.

Figure 4A:
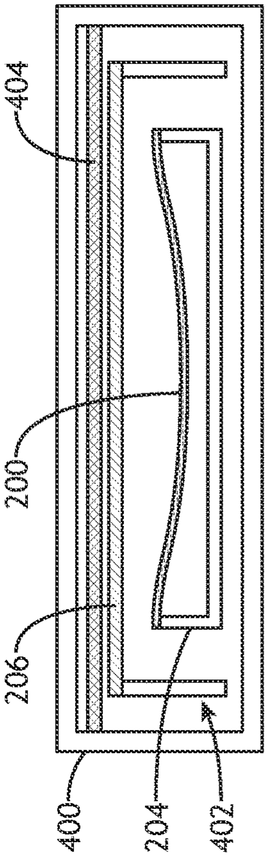
FIGS. 4A-4D illustrate schematically the tooling and sequential steps for DDF laminating a bonded compound curve substrate, in accordance with example embodiments of this disclosure.
Figure 4B:
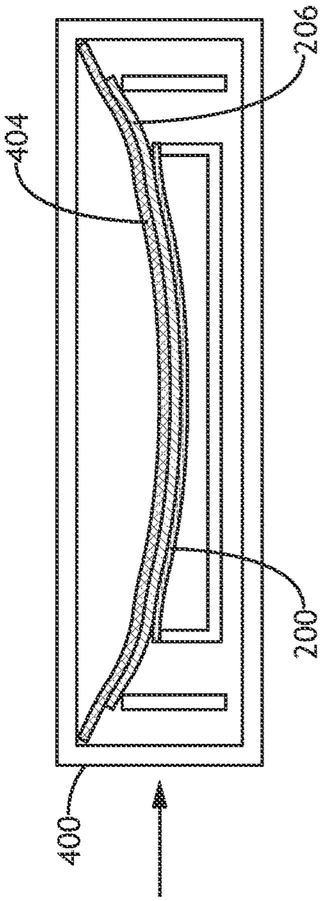
Figure 4C:
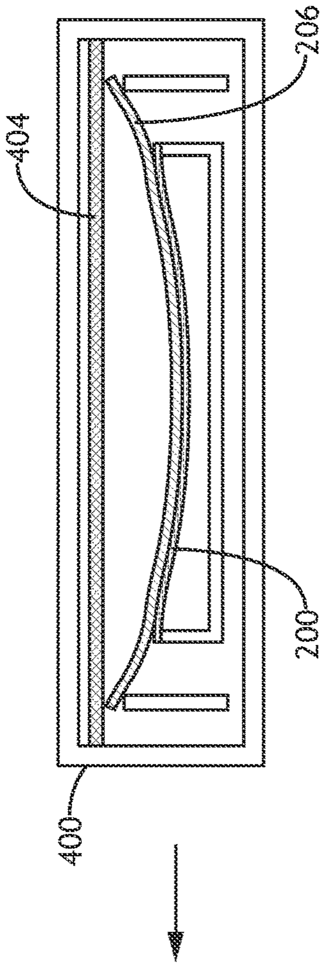
Figure 4D:
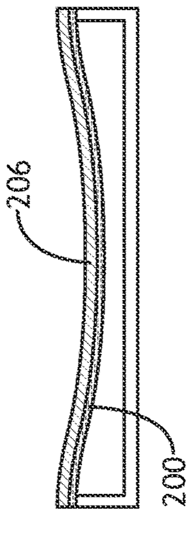

FIG. 4A shows the positional relationships of the DDF chamber 400, bladder 404, OCA sheet 206, and substrate 200 for bonding, and with the DDF chamber 400 evacuated. FIG. 4B shows the bladder 404 deployed, e.g., resiliently deformed, into contact with the OCA sheet 206 thereby moving the OCA sheet 206 into conformed contact with the highly curved bonding surface of the substrate 200. The conformed contact may be maintained for a predetermined time period to ensure adequate bonding with the surface of the substrate 200. FIG. 4C shows the bladder 404 retracted out of contact with the now conformed OCA sheet 206 bonded to the substrate 200, and with the DDF chamber 400 vented. FIG. 4D shows the substrate 200, having the bonded OCA sheet 206 applied thereto, removed from the DDF chamber for further processing, for instance bonding a flexible film or further compound curved part.

Figure 5:
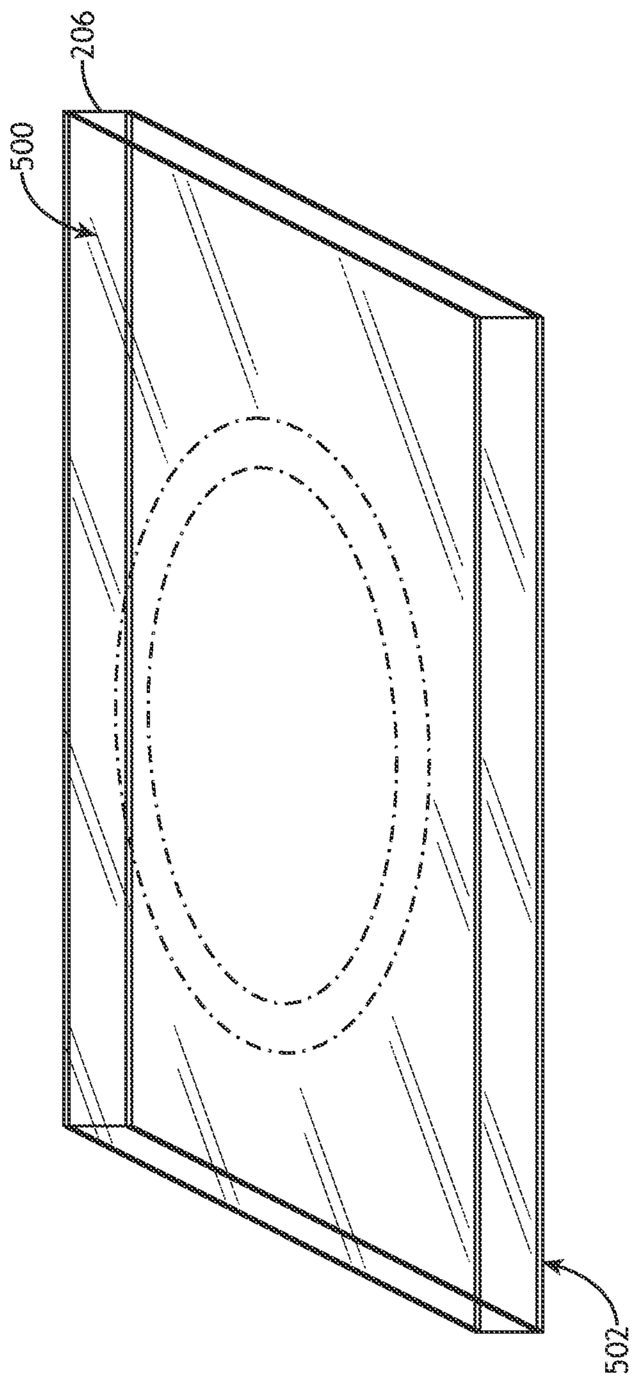
FIG. 5 is a schematic illustration of a structurally altered top liner of an OCA to introduce flexibility, in accordance with example embodiments of this disclosure.

FIG. 5 shows a structurally altered top liner of an OCA sheet 206 to introduce flexibility to the sheet for facilitating conformity. In embodiments, the OCA sheet 206 includes a top and a bottom. As used herein, considering the figure orientations, the "top" refers to the sheet side facing away from the underlying substrate and the "bottom" refers to the sheet side facing the underlying substrate. The top is covered with a removable top liner 500 and the bottom is covered with a removable bottom liner 502. In use, the top and bottom liners 500, 502 maintain planarity and cleanliness of the OCA sheet 206 prior to bonding. The bottom liner 502 is removed prior to evacuating the DDF chamber. The top liner 500 remains in place during the DDF process.

The top liner 500 is shown having been structurally altered depending on the curvature of the substrate. Structural altering may include scoring, cutting, combinations of both, and the like for introducing a weakness in the top liner 500 to facilitate stretching the OCA sheet 206 during the conformed contact step. Structurally altering the top liner 500 allows the OCA sheet 206 to better conform to the curved shape of the substrate under the force of the deployed bladder. The locations of the structural altering may correspond to the curvature of the substrate such that a steeper substrate curve may require greater altering whereas a shallower curve or planar section of the substrate may require lesser altering.

Figure 6:
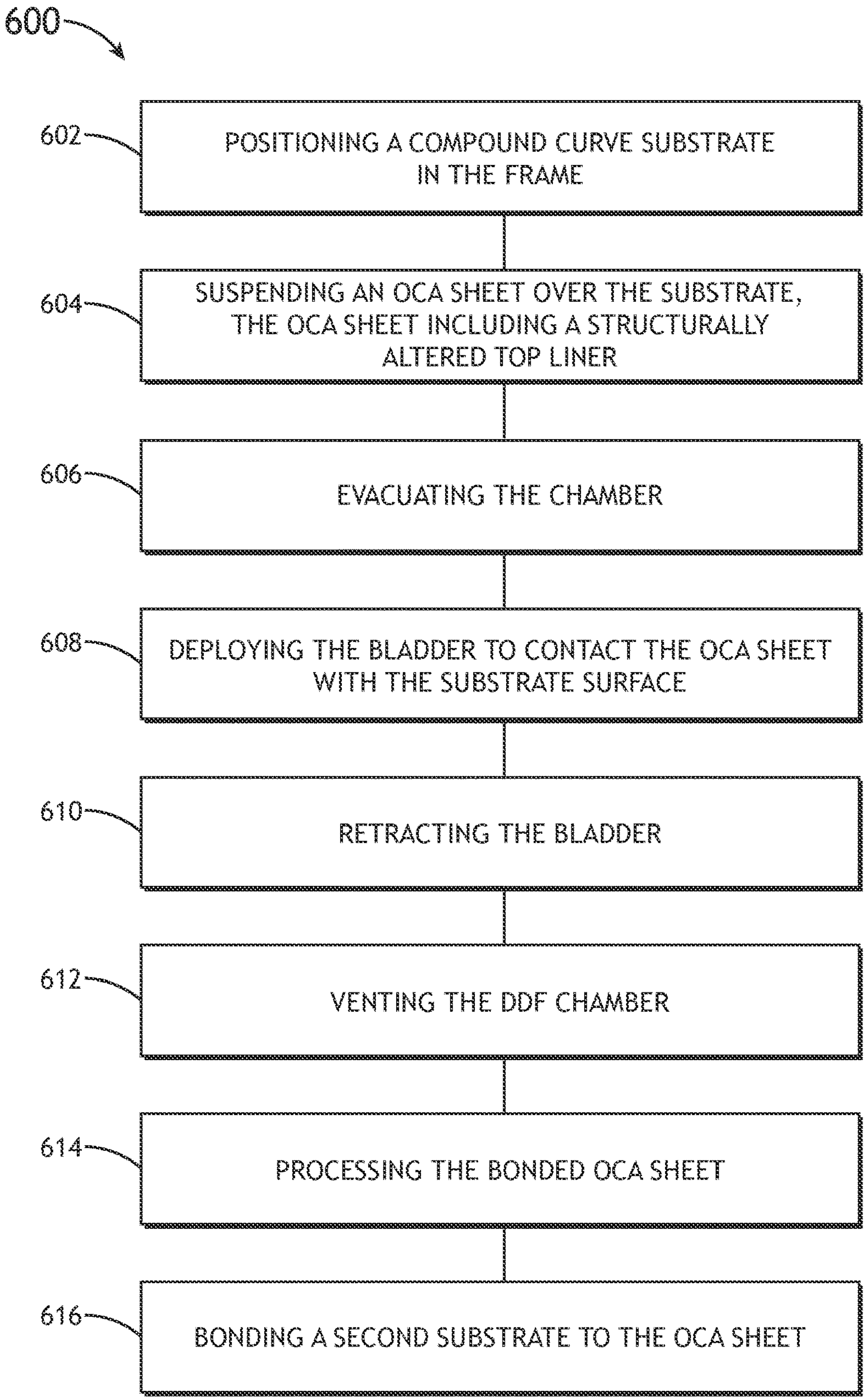
FIG. 6 is a flow diagram illustrating an example implementation of a method of DDF laminating compound curve products, in accordance with example embodiments of this disclosure.

FIG. 6 illustrates an example implementation of a method 600 of DDF laminating a compound curve substrate. In general, operations of disclosed processes (e.g., method) may be performed in an arbitrary order, unless otherwise provided in the claims. The method may further include any step or operation implied or required by the product embodiments described herein. The products described above may also include any additional component or functionality expressed or implied by the method.

The method occurs in a DDF chamber including an interior space, a deployable bladder positioned in the interior space, and a frame positioned in the interior space beneath the deployable bladder, the frame configured to suspend an OCA sheet. At Step 602, the method includes a compound curve substrate in an interior space formed by the frame. At Step 604, the method includes suspending an OCA sheet, by the frame, over the to-be-bonded surface of the compound curve substrate. The OCA sheet may be altered in place, or previously altered outside of the DDF chamber to introduce a bending weakness in the OCA sheet corresponding to curvature of the underlying compound curve substrate.

With the compound curve substrate and the OCA sheet positioned for bonding, the method continues at Step 606 with evacuating the chamber to induce a vacuum, and Step 608 with deploying the bladder into contact with the OCA sheet to move the OCA sheet into conformed contact with the surface of the compound curve substrate to bond the OCA sheet to the surface. The conformed contact may be maintained for a predetermined time period, for instance a matter of seconds or minutes to ensure bonding. After bonding is ensured, the method continues at Step 610 with retracting the bladder and Step 612 with venting the DDF chamber.

With the OCA sheet already bonded to the surface of the compound curve substrate, at Step 614 the bonded OCA sheet may be further processed, such as trimmed and the top liner removed. At Step 616, a second substrate, for instance a flexible film or matching curved substrate, may be bonded to the top of the OCA sheet, for instance within the DDF chamber also via the deployable bladder.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A method of direct dry film (DDF) laminating a compound curve substrate, comprising:
providing a chamber including a bladder;
positioning a frame in the chamber, the frame forming an interior space;
positioning a compound curve substrate in the interior space;
suspending, by the frame, an optically clear adhesive (OCA) sheet over the compound curve substrate, the OCA sheet including a top liner;
structurally altering the top liner at one or more locations corresponding to curvature of the compound curve substrate, wherein the structural altering introduces a localized weakness in the top liner to facilitate stretching of the OCA sheet;
evacuating the chamber to induce a vacuum;
deploying, with the compound curve substrate held stationary, the bladder into contact with the OCA sheet to move the OCA sheet into conformed contact with a surface of the compound curve substrate to bond the OCA sheet to the surface;
retracting the bladder; and
venting the chamber.

2. The method according to claim 1, wherein the OCA sheet further includes a bottom liner, and the method further comprises removing the bottom liner prior to evacuating the chamber.

3. The method according to claim 1, wherein structurally altering the top liner comprises scoring the top liner.

4. The method according to claim 1, wherein structurally altering the top liner comprises cutting the top liner.

5. The method according to claim 1, further comprising:
positioning a second substrate in the chamber;
evacuating the chamber to induce a vacuum;
deploying the bladder into contact with the second substrate to move the second substrate into conformed contact with the OCA sheet;
retracting the bladder; and
venting the chamber.

6. The method according to claim 1, wherein the second substrate is a flexible film or a rigid compound curve substrate having a curvature profile matching a curvature profile of the compound curve substrate.

7. The method according to claim 1, further comprising, after venting the chamber:
trimming the OCA sheet bonded to the surface of the compound curve substrate; and
removing the top liner.

8. The method according to claim 1, wherein the OCA sheet is maintained in conformed contact with the compound curve substrate for a predetermined time period.

9. The method according to claim 1, wherein the method further comprises heating at least one of the chamber, the OCA sheet, and the compound curve substrate.

10. The method according to claim 1, wherein the OCA sheet is coupled to the frame by a plurality of elastic members.

11. A laminated compound curve product, comprising:
a compound curve substrate and a second substrate bonded together by an intermediate optically clear adhesive (OCA) sheet, wherein the laminated compound curve product is produced according to a method of direct dry film (DDF) lamination comprising:
providing a chamber including a bladder;
positioning a frame in the chamber, the frame forming an interior space;
positioning the compound curve substrate in the interior space;
suspending, by the frame, the OCA sheet over the compound curve substrate, the OCA sheet including a top liner structurally altered at one or more locations corresponding to curvature of the compound curve substrate, wherein the structural altering introduces a localized weakness in the top liner to facilitate stretching of the OCA sheet;
evacuating the chamber to induce a vacuum;
deploying, with the compound curve substrate held stationary, the bladder to move the bladder into contact with the OCA sheet to move the OCA sheet into conformed contact with a surface of the compound curve substrate;
retracting the bladder;
venting the chamber; and
bonding the second substrate to the OCA sheet bonded to the surface of the compound curve substrate.

12. The product according to claim 11, wherein the OCA sheet further includes a bottom liner, and the method further comprises removing the bottom liner prior to evacuating the chamber.

13. The product according to claim 11, wherein the structurally altered top liner is scored.

14. The product according to claim 11, wherein the structurally altered top liner is cut.

15. The product according to claim 11, wherein the method further comprises:
positioning the second substrate in the chamber;
evacuating the chamber to induce a vacuum;
deploying the bladder into contact with the second substrate to bring the second substrate into conformed contact with the OCA sheet;
retracting the bladder; and
venting the chamber.

16. The product according to claim 11, wherein the second substrate is a flexible film or a rigid compound curve substrate having a curvature profile matching a curvature profile of the compound curve substrate.

17. The product according to claim 11, further comprising, after venting the chamber:
trimming the OCA sheet; and
removing the top liner.

18. The product according to claim 11, wherein the OCA sheet is maintained in conformed contact with the compound curve substrate for a predetermined time period.

19. The product according to claim 11, wherein the method further comprises heating at least one of the chamber, the OCA sheet, and the compound curve substrate.

20. The product according to claim 11, wherein the OCA sheet is coupled to the frame by a plurality of elastic members.

* * * * *